United States Patent

Tamaki et al.

[11] Patent Number: 6,131,057
[45] Date of Patent: *Oct. 10, 2000

[54] PROTECTING DEVICE OF ELECTROMOBILE

[75] Inventors: Satoshi Tamaki, Hirakata; Yasufumi Ikkai, Kobe; Yasuhiro Kondo, Hirakata, all of Japan

[73] Assignee: Matsushita Electric Industrial Co., Ltd., Osaka-fu, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/874,485

[22] Filed: Jun. 13, 1997

Related U.S. Application Data

[62] Division of application No. 08/676,418, Jul. 8, 1996, abandoned, which is a division of application No. 08/307,053, Sep. 16, 1994, abandoned.

[30] Foreign Application Priority Data

Sep. 17, 1993 [JP] Japan ..................... 5-232076

[51] Int. Cl.[7] ..................................................... B60L 3/00
[52] U.S. Cl. ............................... 701/22; 701/34; 180/65.1
[58] Field of Search ...................... 701/22, 34; 180/65.1; 318/638, 652, 653; 324/76.52, 76.77

[56] References Cited

U.S. PATENT DOCUMENTS

| | | | |
|---|---|---|---|
| 3,556,165 | 1/1971 | Lohr | 310/67 R |
| 3,562,617 | 2/1971 | Meier | 388/830 |
| 4,090,114 | 5/1978 | Thompson | 318/139 |
| 4,126,889 | 11/1978 | Ibamoto et al. | 361/92 |
| 4,207,503 | 6/1980 | Irschik et al. | 318/139 |
| 4,242,617 | 12/1980 | Jennings | 318/13 |
| 4,500,820 | 2/1985 | Noto et al. | 318/139 |
| 5,272,424 | 12/1993 | Lee | 318/560 |
| 5,304,912 | 4/1994 | Kajiwara et al. | 318/802 |
| 5,371,446 | 12/1994 | Imaseki | 318/52 |
| 5,414,339 | 5/1995 | Masaki et al. | 318/800 |
| 5,444,340 | 8/1995 | Tamaki et al. | 318/139 |
| 5,461,531 | 10/1995 | Tuchiya et al. | 361/28 |
| 5,469,032 | 11/1995 | Otake | 318/439 |
| 5,471,384 | 11/1995 | Nakashima et al. | 701/22 |
| 5,481,460 | 1/1996 | Masaki et al. | 364/424.07 |
| 5,508,924 | 4/1996 | Yamashita | 364/426.03 |
| 5,519,294 | 5/1996 | Chen et al. | 318/432 |
| 5,583,411 | 12/1996 | Kusano et al. | 318/719 |

FOREIGN PATENT DOCUMENTS 503897  9/1992  European Pat. Off. .

OTHER PUBLICATIONS

IEEE Transactions on Industry Applications, vol. IA–23, No. 4, Jul./Aug. 1987 to Thmas M. Jahns and entitled "Flux–Weakening Regime Operation of an Interior Permanent–Magnet Synchronous Motor Drive".

*Primary Examiner*—Michael J. Zanelli
*Attorney, Agent, or Firm*—Wenderoth, Lind & Ponack, L.L.P.

[57] ABSTRACT

A protecting device of electromobile has control device to control the rotating speed of a motor on the basis of an accelerator signal, a brake signal, and output signals from an encoder sensor, a CS sensor, and a phase current detector, which includes a device for detecting interruption of input of the output signals and outputting detecting signal, a device for stopping supply of electricity to the motor in response to the detecting signal of the detecting device, a device for detecting a value of a phase current of the motor and outputting a detecting signal when the phase current is abnormal, and a device for stopping supply of electricity to the motor in response to the detecting signal of the phase current detecting device

2 Claims, 2 Drawing Sheets

PROTECTING DEVICE OF ELECTROMOBILE

This application is a Divisional of now-abandoned application Ser. No. 08/676,418 filed Jul. 8, 1996, which is a divisional of now abandoned application Ser. No. 08/307,053, filed Sep. 16, 1994.

BACKGROUND OF THE INVENTION

The present invention relates to a protecting device for a fail-safe purpose in case of a failure, an accident, etc. in an electromobile incorporating a synchronous motor therein as a power source.

The development of electromobiles has been rapidly progressed from the viewpoint of countermeasures against environmental problems, and the power source of an increasing number of the recent electromobiles has been replaced with an alternating current motor from a direct current motor because of its advantageous points such as maintenance easiness and the like. Particularly, a synchronous motor using a magnet as a rotor is highly efficient, and therefore eagerly fitted for use in the electromobiles. While the synchronous motor of this kind has conventionally been widely used in the factory automation or industrial field, the basic controlling system of the synchronous motor used in electromobiles is almost the same as in the factory automation or industrial usage.

However, because of the undeniable fact that human lives are exposed to a high risk in vehicles, it is necessary to take all possible fail-safe measures.

SUMMARY OF THE INVENTION

The object of the present invention is therefore to provide a protecting device of an electromobile designed to secure safety in case of an emergency or abnormality.

In accomplishing these and other objects, according to a first aspect of the present invention, there is provided a protecting device of an electromobile having a control device to control a rotating speed of a motor on the basis of a control signal of the motor, which comprises:

a detecting means for detecting interruption of input of the control signal of the motor and outputting a detecting signal; and a stopping means for stopping supply of electricity to the motor in response to the detecting signal of the detecting means.

According to a second aspect of the present invention, there is provided the protecting device as described in the first aspect, wherein the control device controls the rotating speed of the motor on the basis of an accelerator signal and a brake signal, and the detecting means is a detecting means for detecting interruption of input of the accelerator signal and outputting the detecting signal.

According to a third aspect of the present invention, there is provided the protecting device as described in the first aspect, wherein the control device controls the rotating speed of the motor on the basis of an accelerator signal, a brake signal, and an output signal from an encoder sensor set in the motor, and the detecting means is a detecting means for detecting interruption of input of the output signal from the encoder sensor and outputting the detecting signal.

According to a fourth aspect of the present invention, there is provided the protecting device as described in the first aspect, wherein the control device controls the rotating speed of the motor on the basis of an accelerator signal, a brake signal, and an output signal from a CS sensor set in the motor, and the detecting means is a detecting means for detecting interruption of input of the output signal from the CS sensor and outputting the detecting signal.

According to a fifth aspect of the present invention, there is provided the protecting device as described in the first aspect, wherein the control device controls the rotating speed of the motor on the basis of an accelerator signal, a brake signal, and an output signal from a phase current detector set in the motor, and the detecting means is a detecting means for detecting interruption of input of the output signal from the phase current detector and outputting the detecting signal.

According to a sixth aspect of the present invention, there is provided a protecting device of an electromobile having a control device to control a rotating speed of a motor on the basis of an accelerator signal and a brake signal, which comprises a current detecting means for detecting a value of a phase current of the motor and outputting a detecting signal, and a stopping means for stopping supply of electricity to the motor when the phase current of the motor is abnormal on the basis of the detecting signal of the current detecting means.

According to a seventh aspect of the present invention, there is provided a protecting device of an electromobile having a control device to control a rotating speed of a motor using a primary battery as a power source on the basis of an accelerator signal and a brake signal, which comprises a current detecting means for detecting a value of a current of the primary battery and outputting a detecting signal, and a stopping means for stopping supply of electricity to the motor when the current of the primary battery is abnormal on the basis of the detecting signal of the current detecting means.

According to an eighth aspect of the present invention, there is provided a protecting device of an electromobile having a control device to control a rotating speed of a motor using a primary battery as a power source on the basis of an accelerator signal and a brake signal, which comprises a voltage detecting means for detecting a value of a voltage of the primary battery and outputting a detecting signal, and a current limiting means for limiting a current fed to the motor by a decreasing amount of the voltage of the primary battery on the basis of the detecting signal of the detecting means.

According to a ninth aspect of the present invention, there is provided a protecting device of an electromobile having a control device to control a rotating speed of a motor using a primary battery as the power source on the basis of an accelerator signal and a brake signal, which comprises a voltage detecting means for detecting a value of a voltage of the primary battery and outputting a detecting signal, and a current limiting means for controlling a field-weakening current fed to the motor on the basis of the detecting signal of the detecting means when the voltage of the primary battery is abnormally increased, thereby reducing a regenerative amount from the motor to the primary battery.

According to a tenth aspect of the present invention, there is provided a protecting device of an electromobile having a control device to control a rotating speed of a motor using a primary battery as a power source on the basis of an accelerator signal and a brake signal, and a control battery to supply electricity to the control device, which comprises a voltage detecting means for detecting a value of a voltage of the control battery and outputting a detecting signal, and a stopping means for stopping supply of electricity to the motor on the basis of the detecting signal of the detecting means when the voltage of the control battery is abnormally decreased.

According to an eleventh aspect of the present invention, there is provided a protecting device of an electromobile having a control device to control a rotating speed of a motor on the basis of an accelerator signal and a brake signal, which comprises a detecting means for detecting overheat of the motor and outputting a detecting signal, and a controlling means for stopping or limiting supply of electricity to the motor in response to the detecting signal of the detecting means.

According to a twelfth aspect of the present invention, there is provided a protecting device of an electromobile having an inverter driving a motor and a control device to control a rotating speed of the motor on the basis of an accelerator signal and a brake signal, which comprises a detecting means for detecting overheat of a switching element of the inverter and outputting a detecting signal, and a controlling means for stopping or limiting supply of electricity to the motor in response to the detecting signal of the detecting means.

BRIEF DESCRIPTION OF THE DRAWING

These and other objects and features of the present invention will become clear from the following description taken in conjunction with the preferred embodiments thereof with reference to the accompanying drawings, in which.

DETAILED DESCRIPTION OF THE PREFERRED EMBODIMENT

Figure 1:
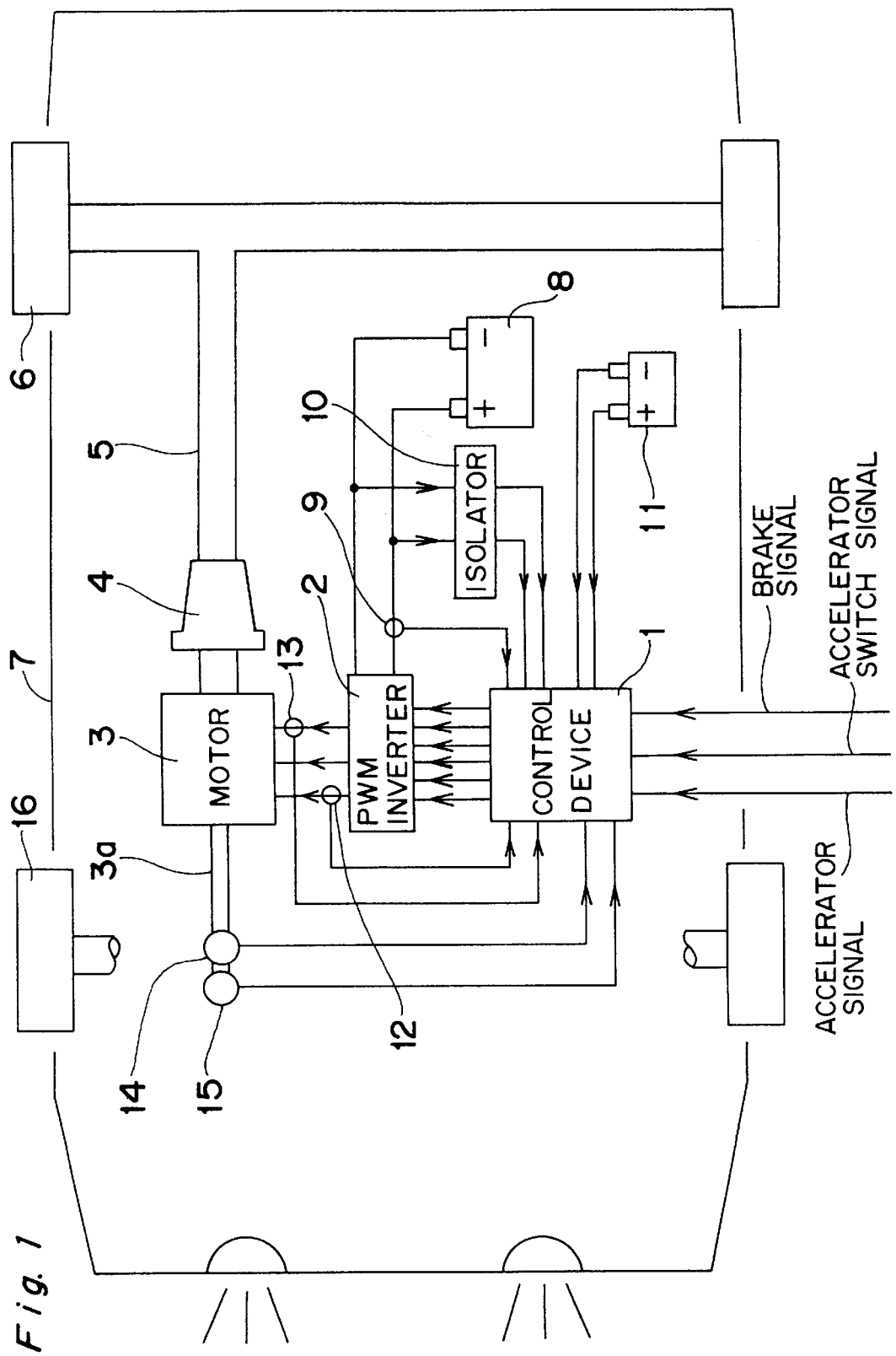
FIG. 1 is a schematic structural diagram of an electromobile provided with a protecting device of one embodiment of the present invention.

Before the description of the present invention proceeds, it is to be noted that like parts are designated by like reference numerals throughout the accompanying drawings.

Preferred embodiments of the present invention will be described with reference to the drawings.

In FIG. 1, there is indicated the concept of a system of an electromobile having a protecting device of one embodiment of the invention incorporated therein. The electromobile uses a synchronous motor under the field-weakening control.

As shown in FIG. 1, the electromobile carries out appropriate operations or calculations including the field-weakening control within a control device 1 when an accelerator signal, an accelerator switch signal interlocking with the accelerator signal and a brake signal are inputted to the control device 1. In consequence, a motor 3 is commutated via a PWM (pulse width modulation) inverter 2. The motor 3 is connected to driving wheels (rear wheels) 6 via a transmission 4 and an axle 5. An electromobile body 7 is started to move as the motor 3 is rotated.

The electricity is supplied to the motor 3 from a primary battery 8. A current and a voltage of the primary battery 8 are monitored at the control device 1 with the use of a current detector 9 and an isolator 10, respectively. At the same time, the control device 1 monitors a voltage of a control battery 11 in receiving electricity from the control battery 11. In the circuit structure of FIG. 1, while a three-phase alternating current is supplied to the motor 3 from the PWM inverter 2, the phase current of the motor 3 is inputted to the control device 1 by current detectors 12, 13. The phase current is thus controlled, and moreover monitored as to whether the motor 3 is normal or abnormal.

When the motor 3 is rotated, an encoder sensor 14 and a CS sensor 15 both connected mechanically to a motor shaft 3a are rotated, generating outputs to the control device 1. Accordingly, the speed of the motor 3 and the positional data of a rotor of the motor 3 are provided. Reference numeral 16 represents front wheels.

The CS sensor, i.e., commutation sensor 15 detects the position of magnetic poles of the rotor of the synchronous motor 3 thereby to determine to which coils the electricity is supplied.

The encoder sensor 14 is a detecting means for detecting the rotating position of the rotor, and outputs pulse trains of two phases in general, namely, A-phase and B-phase pulses shifted 90° from reference pulses (Z-phase pulses; one pulse per one 360° rotation). Owing to the shift of the phase, the encoder sensor 14 can detect the rotating direction of the rotor. Moreover, the encoder sensor 14 detects the rotating angle of the rotor by counting the pulse trains.

The rotating angle and the rotating speed are detected in a manner as will be detailed hereinbelow.

For instance, supposing that 1000 pulses are generated per one rotation of the motor 3 when only the leading edges of the A-phase and B-phase pulses are counted, the 500th pulse counted from the Z-phase pulse corresponds to the fact that the rotor is at the 180° phase. The speed of the motor 3 is detected by counting the number of A-phase or B-phase pulses within a fixed time interval. For example, the motor 3 is rotated twice in one second if 2000 pulses are counted in one second, that is, the motor 3 is rotated at 120 rpm.

The CS sensor 15 may be considered to be substantially unnecessary so long as outputs can be obtained from the encoder sensor 14, because the output signal of the encoder sensor 14 itself indicates the rotating angle of the rotor. However, since the encoder signal becomes effective only after the reference Z-phase pulse is inputted, the current to the coils is commutated in accordance with the output of the CS sensor until the Z-phase pulse is inputted, and the commutating timing of the current to the motor 3 is produced based on the Z-phase pulse after the Z-phase pulse is inputted.

In other words, the commutating timing of the current to the coils is fabricated with the use of outputs of the CS and encoder sensors so as to control the motor 3. Moreover, a signal to show the actual rotating speed of the motor 3 is generated to control the speed of the motor 3.

Unless following signals are correctly inputted to the control device 1 in the above-described system of the electromobile, it is impossible to protect the electromobile not to be endangered. As such, the protecting device is adapted to monitor the following signals concurrently for the fail-safe driving of the electromobile by means of the built-in function in the control device 1.

(A) to detect interruption of signals:
    1) accelerator signals
    2) output signals from the encoder sensor 14
    3) output signals from the CS sensor 15
    4) output signals from the phase-current detectors 12,13 of the motor 3

(B) to detect currents:
1) phase current of the motor 3
2) current of the primary battery 8
(C) to detect voltages of batteries:
1) voltage of the primary battery 8
2) voltage of the control battery 11
(D) to detect overheat:
1) motor 3
2) switching element of the PWM inverter 2

Figure 2:
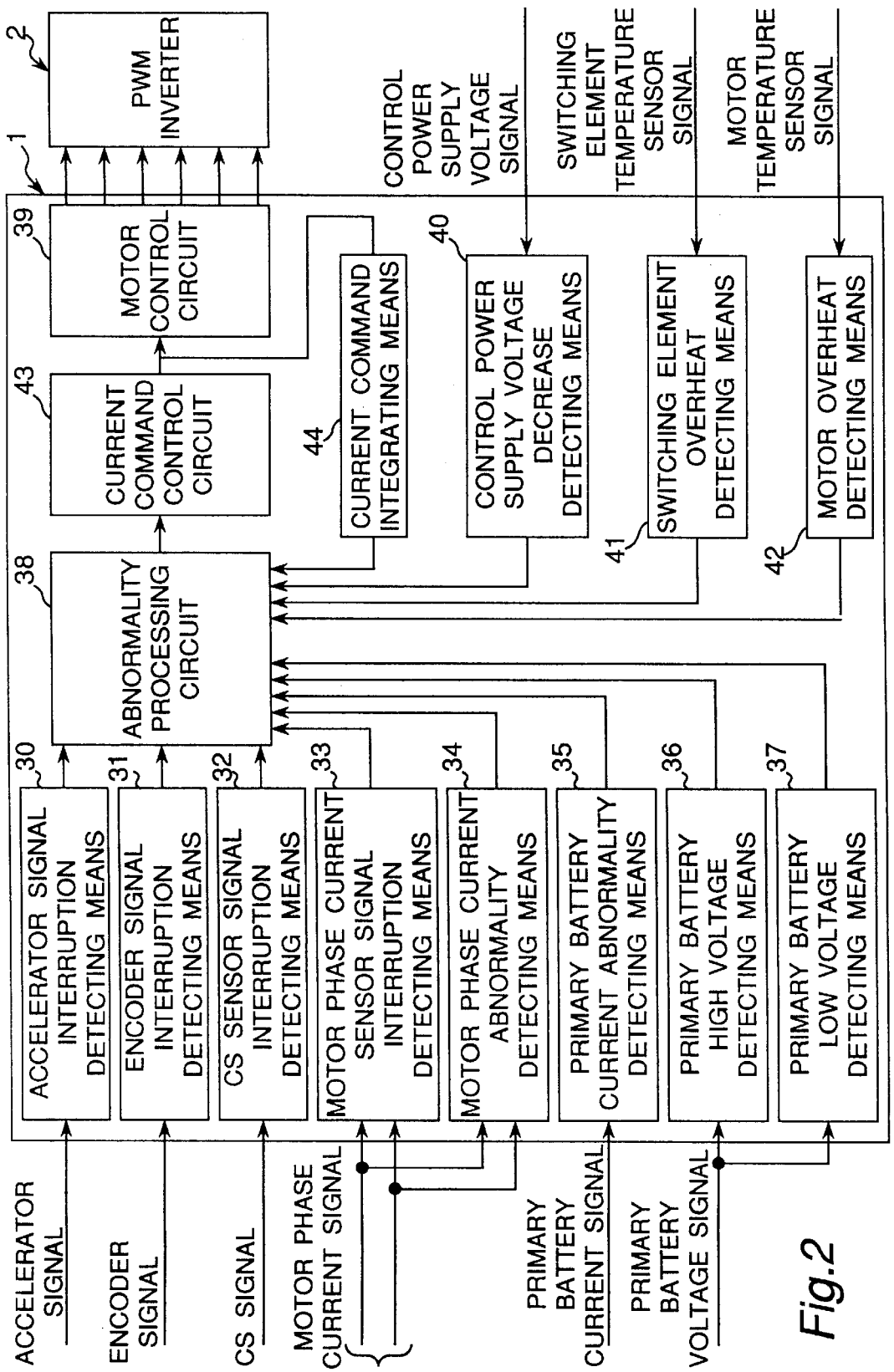
FIG. 2 is a block diagram of a control device of the electromobile.

In the embodiment, the control device 1 includes an accelerator signal interruption detecting means 30, an encoder sensor interruption detecting means 31, a CS sensor signal interruption detecting means 32, a motor phase current sensor signal interruption detecting means 33, a motor phase current abnormality detecting means 34, a primary battery current abnormality detecting means 35, a primary battery high voltage detecting means 36, a primary battery low voltage detecting means 37, a control power supply voltage decrease detecting means 40, a switching element overheat detecting means 41, a motor overheat detecting means 42, an abnormality processing circuit 38 connected to the above means 30–37 and 40–42, a current command control circuit 43, a motor control circuit 39 connected to the abnormality processing circuit 38 via the current command control circuit 43, and a current command integrating means 44 which connects the current command control circuit 43 and the abnormality processing circuit 38, as shown in FIG. 2. These means 30–37, 40–42, and 44 and circuits 38, 39, 43 incorporated in the control device 1 of FIG. 1 to fulfill the fail-safe function are described hereinbelow.

The accelerator signal interruption detecting means 30 detects interruption of inputs of accelerator signals.

The encoder sensor interruption detecting means 31 detects interruption of inputs of signals from the encoder sensor 14.

The CS sensor signal interruption detecting means 32 detects interruption of inputs of signals from the CS sensor 15.

The motor phase current sensor signal interruption detecting means 33 detects interruption of inputs of signals from the phase current detectors 12, 13.

The motor phase current abnormality detecting means 34 detects abnormality of a value of the phase current of the motor 3.

The primary battery current abnormality detecting means 35 detects a value of the current of the primary battery 8.

The primary battery high voltage detecting means 36 detects a value of the voltage of the primary battery 8.

The primary battery low voltage detecting means 37 detects a value of the voltage of the primary battery 8.

The control power supply voltage decrease detecting means 40 detects a value of the voltage of the control battery 11.

The switching element overheat detecting means 41 detects overheat of the switching element of the PWM inverter 2.

The motor overheat detecting means 42 detects overheat of the motor 3.

The abnormality processing circuit 38 outputs a signal for stopping control of the motor 3, that is, stopping the supply of electricity to the motor 3 (the expression "stop control" means to stop the supply of electricity to the motor, which applies to the whole of the description below. If the control might be stopped, the electromobile runs by inertia.) to the motor control circuit 39 via the current command control circuit 43 in response to the detecting signal of one of the above detecting means 30–37 and 40–42. That is, the abnormality processing circuit 38 outputs a signal for stopping control of the motor 3 when the phase current of the motor 3 is abnormal on the basis of the detecting signal of the motor phase current abnormality detecting means 34, a signal for stopping control of the motor 3 when the current of the primary battery 8 is abnormal on the basis of the detecting signal of the primary battery current detecting means 35, a signal for limiting the current fed to the motor 3 by the decreasing amount whereby the voltage of the primary battery 8 is decreased on the basis of the detecting signal of the primary battery low voltage detecting means 37, a signal for controlling the field-weakening current fed to the motor 3 when the voltage of the primary battery 8 is abnormally increased on the basis of the detecting signal of the primary battery high voltage detecting means 36 thereby to reduce the regenerative amount from the motor 3 to the primary battery 8, a signal for stopping control of the motor 3 when the voltage of the control battery 11 is abnormally decreased on the basis of the detecting signal of the control battery voltage decrease detecting means 40, a signal for stopping or controlling the supply of electricity to the motor 3 in response to the detecting signal of the motor overheat detecting means 42, and a signal for stopping or controlling the supply of electricity to the motor 3 in response to the detecting signal of the switching element overheat detecting means 41.

The fail-safe control operation exerted by each means will be discussed below.

The accelerator signal interruption detecting means 30 detects that inputting of accelerator signals is interrupted and a signal indicating this condition is inputted in the abnormality processing circuit 38, the supply of electricity to the motor 3 is stopped via the current command control circuit 43, the motor control circuit 39, and the PWM inverter 2, so that the abnormal rotation of the motor 3 is prevented, thus securing the safety.

The encoder sensor interruption detecting means 31 detects that inputting of output signals from the encoder sensor 14 is interrupted and a signal indicating this condition is inputted in the abnormality processing circuit 38, the supply of electricity to the motor 3 is stopped via the current command control circuit 43, the motor control circuit 39, and the PWM inverter 2, so that the abnormal rotation of the motor 3 is prevented, and the safety is secured. As one example of the concrete structure and operation for the fail-safe function at detecting interruption of accelerator signals or disconnection, The CS sensor signal interruption detecting means 32 detects that inputting of output signals from the CS sensor 15 is interrupted and a signal indicating this condition is inputted in the abnormality processing circuit 38, the supply of electricity to the motor 3 is stopped via the current command control circuit 43, the motor control circuit 39, and the PWM inverter 2, thereby to prevent the abnormal rotation of the motor 3, with the safety secured.

The motor phase current sensor signal interruption detecting means 33 detects that inputting of the output signal from the phase current detectors 12 or 13 is interrupted and a signal indicating this condition is inputted in the abnormality processing circuit 38, the abnormal rotation of the motor 3 is prevented by stopping the supply of electricity to the motor 3 via the current command control circuit 43, the motor control circuit 39, and the PWM inverter 2, so that the safety is secured.

The motor phase current abnormality detecting means 34 detects that the phase current of the motor 3 is turned abnormal and a signal indicating this condition is inputted in the abnormality processing circuit 38, the supply of electricity to the motor 3 is stopped to prevent the abnormal rotation of the motor 3 via the current command control circuit 43, the motor control circuit 39, and the PWM inverter 2, and the safety is secured.

The primary battery current abnormality detecting means 35 detects that the current of the primary battery 8 becomes abnormal and a signal indicating this condition is inputted in the abnormality processing circuit 38, the supply of electricity to the motor 3 is stopped via the current command control circuit 43, the motor control circuit 39, and the PWM inverter 2 to prevent the abnormal rotation of the motor 3, thereby to secure the safety.

The primary battery low voltage detecting means 37 detects that the voltage of the primary battery 8 is decreased and a signal indicating this condition is inputted in the abnormality processing circuit 38, the current fed to the motor 3 is limited by the decreasing amount of the voltage via the current command control circuit 43, the motor control circuit 39, and the PWM inverter 2. Therefore, the motor 3 is slowed, decelerating the electromobile, restricting the consumption of the primary battery 8, thus securing the safety.

The primary battery high voltage detecting means 36 detects that the voltage of the primary battery 8 is abnormally increased and a signal indicating this condition is inputted in the abnormality processing circuit 38, the field-weakening current fed to the motor 3 is controlled via the current command control circuit 43, the motor control circuit 39, and the PWM inverter 2, thereby to reduce the regenerative amount from the motor 3 to the primary battery 8. Accordingly, overcharging of the primary battery 8 is prevented, and the primary battery 8 is protected, and the safety is secured. This field-weakening control is described in, for example, "Flux-Weakening Regime Operation of an Interior Permanent-Magnet Synchronous Motor Drive" by Thomas M. Jahns of IEEE Transactions on Industry Applications, Vol. IA-23, No.4, July/August 1987, and European Patent Publication No. 0 503 879 A2, and a U.S. patent application filed on Sep. 16, 1994, entitled "METHOD AND APPARATUS FOR CONTROLLING MOTOR", claiming three priority rights based on Japanese Patent Application Nos. 5-232075, 5-232077, and 5-232080.

The control power supply voltage decrease detecting means 40 detects that the voltage of the control battery 11 is abnormally decreased and a signal indicating this condition is inputted in the abnormality processing circuit 38, the supply of electricity to the motor 3 is stopped via the current command control circuit 43, the motor control circuit 39, and the PWM inverter 2, the abnormal rotation of the motor 3 resulting from the abnormality of the control device 1 is prevented, thereby securing the safety.

The switching element overheat detecting means 41 detects that the switching element of the PWM inverter 2 is overheated and a signal indicating this condition is inputted in the abnormality processing circuit 38, the supply of electricity to the motor 3 is stopped or limited via the current command control circuit 43, the motor control circuit 39, and the PWM inverter 2, and therefore, the generation of heat from the switching element is restricted. The switching element of the PWM inverter 2 is protected and the safety is secured.

The motor overheat detecting means 42 detects that the motor 3 is overheated and a signal indicating this condition is inputted in the abnormality processing circuit 38, the supply of electricity to the motor 3 is stopped or limited via the current command control circuit 43, the motor control circuit 39, and the PWM inverter 2, and therefore the generation of heat from the motor 3 is suppressed and the motor 3 is protected, ensuring the safety.

The concrete structure and operation for the fail-safe function will now be described in detail hereinbelow.

[1] to detect interruption of signals (to detect disconnection):

(1) accelerator signals

Supposing that 5 V represents the maximum speed in a system wherein the level of accelerator signals changes from 0 V to 5 V, it never happens that a signal larger than 5 V is inputted. Therefore, if it is detected by the means 30 that a value larger than 5 V is outputted during monitoring of the accelerator signals, the above fail-safe control is carried out.

(2) output signals from the encoder sensor 14 and CS sensor 15

If the encoder sensor and CS sensor signal interruption detecting means 31, 32 detect that these signals from the sensors 14, 15 are not inputted, the control device 1 cannot recognize the speed of the motor 3 and the position of the rotor. Therefore, the above fail-safe control is carried out.

(3) detector of the phase current of the motor 3

The change of output values of the phase current detector 12, 13 which results from the disconnection of a line of a power source (+15 V, −15 V, GND) for driving the phase current detectors 12, 13 is monitored by the motor phase current sensor signal interruption detecting means 33. The above fail-safe control is carried out when the disconnection is detected by the motor phase current sensor signal interruption detecting means 33.

[2] to detect currents:

(1) phase current of the motor 3

When the motor phase current abnormality detecting means 34 detects that the output from one of the phase current detectors 12, 13 corresponds to a value not conceivable from the characteristic viewpoint of the motor 3, the fail-safe control is carried out.

(2) current of the primary battery 8

When the primary battery current abnormality detecting means 35 detects that the detected output from the current detector 12 or 13 corresponds to a value not conceivable from the characteristic viewpoint of the primary battery 8, the fail-safe control is carried out.

[3] to detect voltages of batteries:

(1) voltage of the primary battery 8

I) decrease

When the primary battery low voltage detecting means 37 detects that the voltage of the primary battery 8 is decreased and nothing other than the voltage of the primary battery 8 is abnormal, the current of the motor 3 is limited by the decreasing amount of the voltage thereby to lower the speed of the electromobile under the above fail-safe control.

II) increase

When the primary battery high voltage detecting means 36 detects that the voltage of the primary battery 8 is increased due to the regeneration so much as deteriorates the characteristic of the primary battery 8, the field-weakening current is controlled under the above fail-safe control, thereby to decrease the regenerative amount.

(2) voltage of the control battery 11

When the voltage of the control battery 11 is decreased, the control device 1 erroneously may operate. In order to solve the problem, the voltage of the control battery 11 is monitored by the control power supply voltage decrease detecting means 40, and the fail-safe control is carried out when the means 40 detects that the voltage becomes abnormal.

[4] to detect overheat:

(1) The temperature of the motor 3 and the switching element of the PWM inverter 2 is monitored with the use of a thermostat which outputs the switching element temperature sensor signals to the switching element overheat detecting means 41 and the motor overheat detecting means 42. When the temperature is not lower than a predetermined value, the supply of electricity to the motor 3 is stopped under the fail-safe control.

(2) Instead of the above temperature measurement, the current values fed to the motor 3, that is, current commands fed from the abnormality processing circuit 38 to the motor control circuit 39 via the current command control circuit 43 are sequentially integrated by the current command integrating means 44 and the integrated values are inputted to the abnormality processing circuit 38. The output of the motor 3 is controlled to be decreased when the integrated value found by the current command integrating means 44 exceeds a predetermined value.

In the case where an abnormality is brought about while the field-weakening current is running, needless to say, the field-weakening current should not be quickly dropped so as to protect the primary battery 8.

In the protecting device, the supply of electricity to the motor is stopped when inputting of accelerator signals is interrupted, so that the abnormal rotation of the motor is prevented and the safety is secured.

The supply of electricity to the motor is stopped when inputting of output signals from the encoder sensor is interrupted, so that the abnormal rotation of the motor is prevented and the safety is secured.

The supply of electricity to the motor is stopped when inputting of output signals from the CS sensor is interrupted, so that the abnormal rotation of the motor is prevented and the safety is secured.

The supply of electricity to the motor is stopped when inputting of output signals from the phase current detector is interrupted, so that the abnormal rotation of the motor is prevented and the safety is secured.

The supply of electricity to the motor is stopped when the phase current of the motor is abnormal, so that the abnormal rotation of the motor is prevented and the safety is secured.

The supply of electricity to the motor is stopped when the current of the primary battery is abnormal, so that the abnormal rotation of the motor is prevented and the safety is secured.

The current fed to the motor is limited by the decreasing amount whereby the voltage of the primary battery is decreased, and the speed of the motor is lowered, so that the electromobile is slowed down, with the consumption of the primary battery suppressed and the safety secured.

The field-weakening current fed to the motor is controlled when the voltage of the primary battery is abnormally increased, thereby reducing the regenerative amount from the motor to the primary battery, preventing overcharging of the primary battery and securing the safety.

The supply of electricity to the motor is stopped when the voltage of the control battery is abnormally decreased, so that the abnormal rotation of the motor due to the abnormality of the control device is prevented and the safety is secured.

The supply of electricity to the motor is stopped or limited when overheat of the motor is brought about, so that the generation of heat from the motor is restricted, the motor is protected, thereby securing the safety.

The supply of electricity to the motor is stopped or limited when the switching element of the PWM inverter is overheated, thereby to suppress the generation of heat from the switching element and protect the switching element, while the safety is secured.

Although the present invention has been fully described in connection with the preferred embodiment thereof with reference to the accompanying drawings, it is to be noted that various changes and modifications are apparent to those skilled in the art. Such changes and modifications are to be understood as included within the scope of the present invention as defined by the appended claims unless they depart therefrom.

What is claimed is:

1. A protecting device for use with an electromobile having a control device to control a rotating speed of a motor on the basis of an accelerator signal and a brake signal, said protecting device comprising:

a current detecting means for detecting a value of a phase current of the motor and outputting a detecting signal; and a stopping means for stopping supply of all electricity to the motor when the phase current of the motor is abnormal on the basis of the detecting signal of said current detecting means.

2. A protecting device for use with an electromobile having a control device to control a rotating speed of a motor on the basis of an accelerator signal and a brake signal, said protecting device comprising:

a current detector operable to detect a value of a phase current of the motor and to output a detecting signal indicative of the value of the phase current; and a stopping circuit operable to stop supply of all electricity to the motor when the phase current of the motor is abnormal based on the detecting signal of said current detector.

* * * * *